US009891916B2

United States Patent
Hooker et al.

(10) Patent No.: US 9,891,916 B2
(45) Date of Patent: Feb. 13, 2018

(54) DYNAMICALLY UPDATING HARDWARE PREFETCH TRAIT TO EXCLUSIVE OR SHARED IN MULTI-MEMORY ACCESS AGENT SYSTEM

(71) Applicant: VIA TECHNOLOGIES, INC., New Taipei (TW)

(72) Inventors: Rodney E. Hooker, Austin, TX (US); Albert J. Loper, Austin, TX (US); John Michael Greer, Austin, TX (US); Meera Ramani-Augustin, Austin, TX (US)

(73) Assignee: VIA TECHNOLOGIES, INC., New Taipei (TW)

( * ) Notice: Subject to any disclaimer, the term of this patent is extended or adjusted under 35 U.S.C. 154(b) by 136 days.

(21) Appl. No.: 14/624,981

(22) Filed: Feb. 18, 2015

(65) Prior Publication Data

US 2016/0110289 A1    Apr. 21, 2016

Related U.S. Application Data

(60) Provisional application No. 62/066,131, filed on Oct. 20, 2014.

(51) Int. Cl.
*G06F 9/30* (2006.01)
*G06F 12/08* (2016.01)
(Continued)

(52) U.S. Cl.
CPC .......... *G06F 9/30047* (2013.01); *G06F 3/061* (2013.01); *G06F 3/0629* (2013.01);
(Continued)

(58) Field of Classification Search
None
See application file for complete search history.

(56) References Cited

U.S. PATENT DOCUMENTS 6,957,317 B2    10/2005    Chen et al.
7,890,704 B2    2/2011    Clark et al.
(Continued)

FOREIGN PATENT DOCUMENTS

CN    101002178 B    2/2013
WO    WO2005091146    9/2005
(Continued)

OTHER PUBLICATIONS

Mowry, Todd Carl "Tolerating Latency Through Software-Controlled Data Prefetching." Stanford University. Mar. 1994. pp. 1-225 Downloaded on Sep. 23, 2014 from http://www.google.com/url?sa=t&rct=j&q=&esrc=s&source=web&cd=7&ved=0CEoQFjAG&url=http%3A%2F%2Fwww.ecs.umass.edu%2Fece%2Fandras%2Fcourses%2FECE668%2FMylectures%2FPrefetching-lecture.ppt&ei=ZQwiVOvRGsuLyAS1yoGgCg&usg=AFQjCNFgJyn22Uh0egaJSvw_P-b9_L2K9Q.
(Continued)

*Primary Examiner* — Denise Tran
(74) *Attorney, Agent, or Firm* — McClure, Qualey & Rodack, LLP

(57) ABSTRACT

A hardware data prefetcher is comprised in a memory access agent, wherein the memory access agent is one of a plurality of memory access agents that share a memory. The hardware data prefetcher includes a prefetch trait that is initially either exclusive or shared. The hardware data prefetcher also includes a prefetch module that performs hardware prefetches from a memory block of the shared memory using the prefetch trait. The hardware data prefetcher also includes an update module that performs analysis of accesses to the memory block by the plurality of memory access agents and, based on the analysis, dynamically updates the prefetch trait to either exclusive or shared while
(Continued)

the prefetch module performs hardware prefetches from the memory block using the prefetch trait.

23 Claims, 8 Drawing Sheets

(51) Int. Cl.
- G06F 3/06 (2006.01)
- G06F 12/0862 (2016.01)
- G06F 12/0831 (2016.01)
- G06F 12/0842 (2016.01)
- G06F 12/084 (2016.01)

(52) U.S. Cl.
CPC ........ *G06F 3/0673* (2013.01); *G06F 9/30109* (2013.01); *G06F 12/0831* (2013.01); *G06F 12/0842* (2013.01); *G06F 12/0862* (2013.01); *G06F 12/084* (2013.01); *G06F 2212/1016* (2013.01); *G06F 2212/452* (2013.01); *G06F 2212/6022* (2013.01); *G06F 2212/6024* (2013.01)

(56) References Cited

U.S. PATENT DOCUMENTS

| | | |
|---|---|---|
| 8,489,823 B2 | 7/2013 | Glover et al. |
| 8,762,649 B2 | 6/2014 | Hooker et al. |
| 8,799,582 B2 | 8/2014 | Sheaffer et al. |
| 8,856,456 B2 | 10/2014 | Hendry et al. |
| 8,880,807 B2 | 11/2014 | Hooker et al. |
| 2004/0158679 A1 | 8/2004 | Hooker |
| 2004/0158682 A1* | 8/2004 | Hooker ............... G06F 9/30047 711/144 |
| 2005/0262307 A1 | 11/2005 | Chiang et al. |
| 2010/0011198 A1 | 1/2010 | Hooker et al. |
| 2010/0205410 A1 | 8/2010 | Alambritis |
| 2012/0144125 A1* | 6/2012 | Greiner ............... G06F 9/30047 711/137 |
| 2013/0254485 A1* | 9/2013 | Kannan ............... G06F 12/0862 711/122 |
| 2014/0280396 A1 | 9/2014 | Oh et al. |
| 2014/0297919 A1 | 10/2014 | Nachimuthu et al. |

FOREIGN PATENT DOCUMENTS

| | | |
|---|---|---|
| WO | WO2013101078 | 7/2013 |
| WO | WO2013101121 | 7/2013 |

OTHER PUBLICATIONS

Moritz, Csaba Andras et al. "Introduction to Prefetching" Nov. 2007, pp. 1-84.

Hennessy, John L. et al. "Computer Architecture: A Quantitative Approach." Fifth Edition 2012. Morgan Kaufmann Publishers, San Francicso, CA. pp. 364-365.

* cited by examiner

DYNAMICALLY UPDATING HARDWARE PREFETCH TRAIT TO EXCLUSIVE OR SHARED IN MULTI-MEMORY ACCESS AGENT SYSTEM

CROSS REFERENCE TO RELATED APPLICATION(S)

This application claims priority based on U.S. Provisional Application, Ser. No. 62/066,131, filed Oct. 20, 2014, which is hereby incorporated by reference in its entirety.

BACKGROUND

The growing disparity between access time to cache memories within a processor versus access time to system memory by the processor highlights the need for good prefetching approaches by the processor. Mowry, for example, described a modification to a compiler to exploit exclusive-mode prefetching. The compiler performs locality analysis to partition memory references into "equivalence classes, which are sets of references that can be treated as a single reference" and inserts "an exclusive-mode prefetch rather than a shared-mode prefetch for a given equivalence class if at least one member of the equivalence class is a write." See Tolerating latency through software-controlled data prefetching, Mowry, Todd Carl, Ph. D, Stanford University, dissertation 1994, page 89.

A disadvantage of a software-based prefetch approach such as Mowry describes is that it increases code size because prefetch instructions are added to the program. The increased code size may require more storage space on the main storage (e.g., disk drive) of the system to hold the larger program as well as in the system memory to hold the larger program as it runs. The additional instructions also consume resources in the processor, such as instruction dispatch slots, reservation station slots, reorder buffer slots, and execution unit slots, all of which may negatively impact the performance of the processor, in particular by reducing the effective lookahead within the instruction window, which is crucial to exploiting instruction level parallelism. Another disadvantage is that it does not provide the benefit for all programs that are run on the processor, but only those programs that have been profiled and compiled using the optimized compiler.

BRIEF SUMMARY

In one aspect the present invention provides a hardware data prefetcher comprised in a memory access agent, wherein the memory access agent is one of a plurality of memory access agents that share a memory. The hardware data prefetcher includes a prefetch trait that is initially either exclusive or shared. The hardware data prefetcher also includes a prefetch module that performs hardware prefetches from a memory block of the shared memory using the prefetch trait. The hardware data prefetcher also includes an update module that performs analysis of accesses to the memory block by the plurality of memory access agents and, based on the analysis, dynamically updates the prefetch trait to either exclusive or shared while the prefetch module performs hardware prefetches from the memory block using the prefetch trait.

In another aspect, the present invention provides a method for hardware data prefetching by a memory access agent, wherein the memory access agent is one of a plurality of memory access agents that share a memory. The method includes initializing a prefetch trait to either exclusive or shared. The method also includes performing hardware prefetches from a memory block of the shared memory using the prefetch trait. The method also includes performing analysis of accesses to the memory block by the plurality of memory access agents. The method also includes dynamically updating the prefetch trait to either exclusive or shared based on the analysis while the prefetch module performs hardware prefetches from the memory block using the prefetch trait.

In yet another aspect, the present invention provides a computer program product encoded in at least one non-transitory computer usable medium for use with a computing device, the computer program product comprising computer usable program code embodied in said medium for specifying a hardware data prefetcher comprised in a memory access agent, wherein the memory access agent is one of a plurality of memory access agents that share a memory. The computer usable program code includes first program code for specifying a prefetch trait that is initially either exclusive or shared. The computer usable program code also includes second program code for specifying a prefetch module that performs hardware prefetches from a memory block of the shared memory using the prefetch trait. The computer usable program code also includes third program code for specifying an update module that performs analysis of accesses to the memory block by the plurality of memory access agents and, based on the analysis, dynamically updates the prefetch trait to either exclusive or shared while the prefetch module performs hardware prefetches from the memory block using the prefetch trait.

DETAILED DESCRIPTION OF THE EMBODIMENTS

Glossary

A memory access agent is a device that accesses system memory. Examples of memory access agents are a processing core, a graphics processing unit (GPU) and a peripheral device that performs a direct memory access (DMA).

A hardware prefetch is a read of data from system memory by a memory access agent that is made because the memory access agent predicted that it will need the data in the future. Specifically, as used herein, a hardware prefetch is not a software prefetch, which refers to a read of data from system memory by a processor that is made because the processor executed an architectural prefetch instruction.

Thus, a processor performs a hardware prefetch based on analysis the processor performs at run-time, i.e., analysis of memory accesses that are contemporaneous with the hardware prefetches. In contrast, with software prefetching the analysis associated with the insertion of architectural prefetch instructions into a program is performed before the execution of the program, i.e., at compile-time, not contemporaneous with the software prefetches. The data read when a hardware prefetch is performed may be instructions the processor executes or the data may be non-instructions, e.g., data operands of the instructions executed by the processor.

A memory block is a sequence of memory locations in system memory. An example of a memory block is a page of memory.

A prefetch trait is a characteristic of a prefetch that indicates whether the reader is requesting exclusive ownership of the implicated cache line (exclusive prefetch trait) or whether it is OK for other memory access agents to retain a copy of the cache line (shared prefetch trait). A prefetch made using an exclusive prefetch trait involves a bus transaction that instructs each other memory access agent to invalidate its local copy of the cache line (and to write back its current value of the data if modified), which is commonly referred to as a read invalidate bus transaction, read with intent to modify bus transaction, read for ownership, or similar term; whereas, a prefetch made using a shared prefetch trait involves a bus transaction that allows other memory access agents to retain a local copy of the cache line in a shared state, which is commonly referred to as simply a read bus transaction, or read shared OK bus transaction, or similar term.

Figure 1:
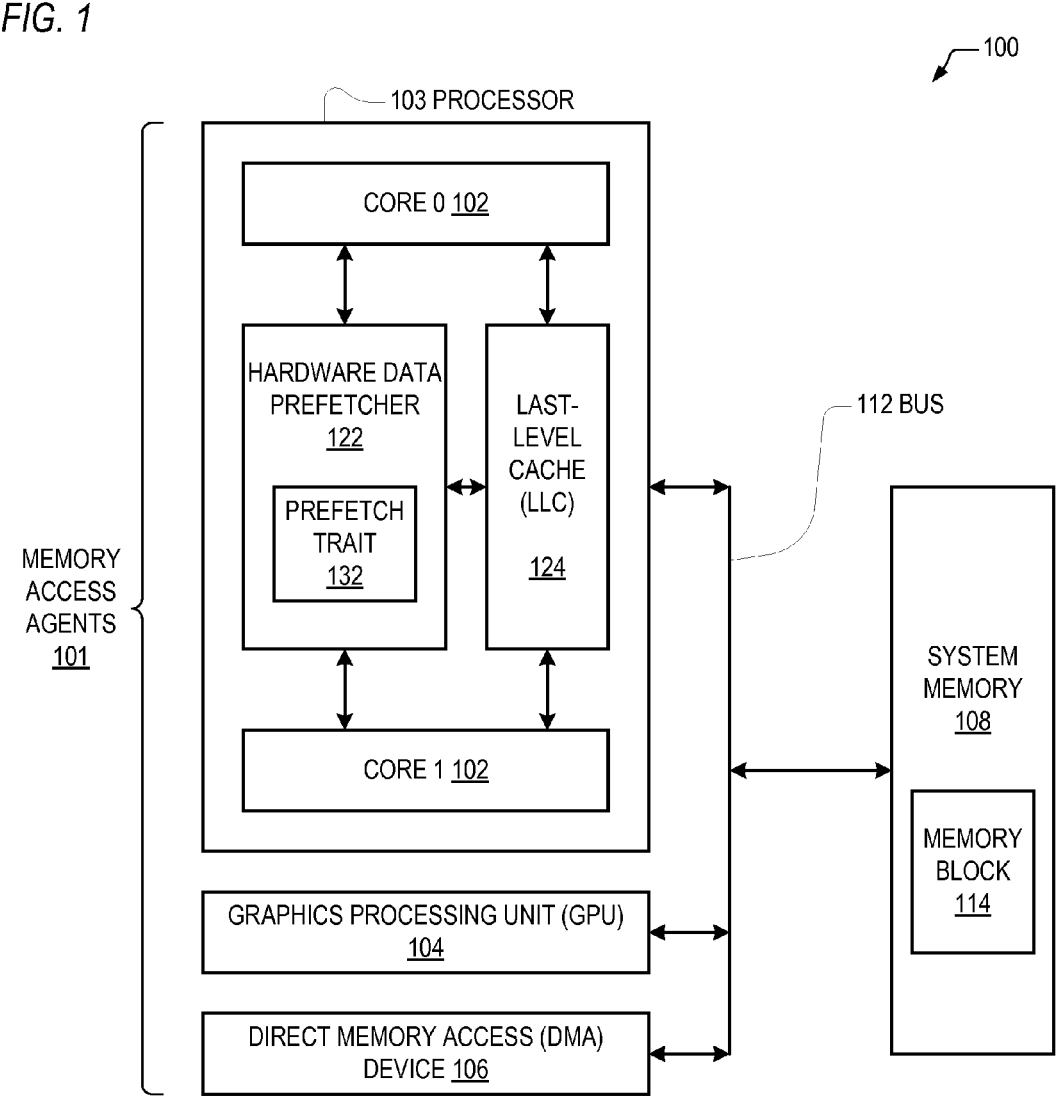
FIG. 1 is a block diagram illustrating a computing system.

Referring now to FIG. 1, a block diagram illustrating a computing system 100 is shown. The computing system 100 includes memory access agents 101 that share a system memory 108 and access the system memory 108 via a bus 112. The memory access agents 101 may include a peripheral device that performs a direct memory access (DMA) 106, a graphics processing unit (GPU) 104, and a processor 103. The processor 103 includes a plurality of processing cores 102, a last-level cache (LLC) memory 124 shared by the cores 102, and a hardware data prefetcher 122. The GPU 104 and the DMA device 106 may also include a hardware data prefetcher 122. Although two cores 102 are shown in FIG. 1, other embodiments are contemplated with other numbers of cores 102.

The hardware data prefetcher 122 includes a prefetch trait 132 that the hardware data prefetcher 122 uses to perform hardware prefetches from a memory block 114 in the system memory 108. The prefetch trait 132 has a value of either exclusive or shared. The hardware data prefetcher 122 dynamically and selectively updates the prefetch trait 132 based on analysis it performs of accesses to the memory block 114 by the memory access agents 101. The hardware data prefetcher 122 is described in more detail below with respect to FIG. 2 and the remaining Figures.

Preferably, the processor 103 also includes a bus interface unit that interfaces the processor 103 to the bus 112. Preferably, each core 102 includes an instruction cache, instruction decoder, instruction dispatcher, memory subsystem (e.g., load/store units, memory order buffer), other execution units and a local data cache (e.g., level-1 data cache).

When the hardware data prefetcher 122 makes a hardware prefetch request to the bus interface unit, it does so with the prefetch trait 132, i.e., shared or exclusive. The bus interface unit responsively performs a transaction on the bus 112 to obtain ownership of the cache line implicated by the hardware prefetch request. If the prefetch trait 132 is exclusive, the bus interface unit performs a bus transaction that instructs the other memory access agents 101 to invalidate their copy of the implicated cache line and to write back its current value of the data if modified. If the prefetch trait 132 is shared, the bus interface unit performs a bus transaction that allows the other memory access agents 101 to retain a local copy of the implicated cache line in a shared state.

When a cache line is prefetched into a cache memory of the processor 103, the cache line may be prefetched such that its state is exclusive to one processing core 102, or the cache line may be prefetched such that its state is shared with other memory access agents 101 that share the system memory 108. If a cache line is going to be shared by multiple cores, 102 for example, then it may be advantageous for the cache line to be prefetched in a shared state; whereas, if a cache line is soon going to be written by the prefetching core 102, then it may be advantageous to prefetch the cache line exclusive rather than shared.

Figure 2:
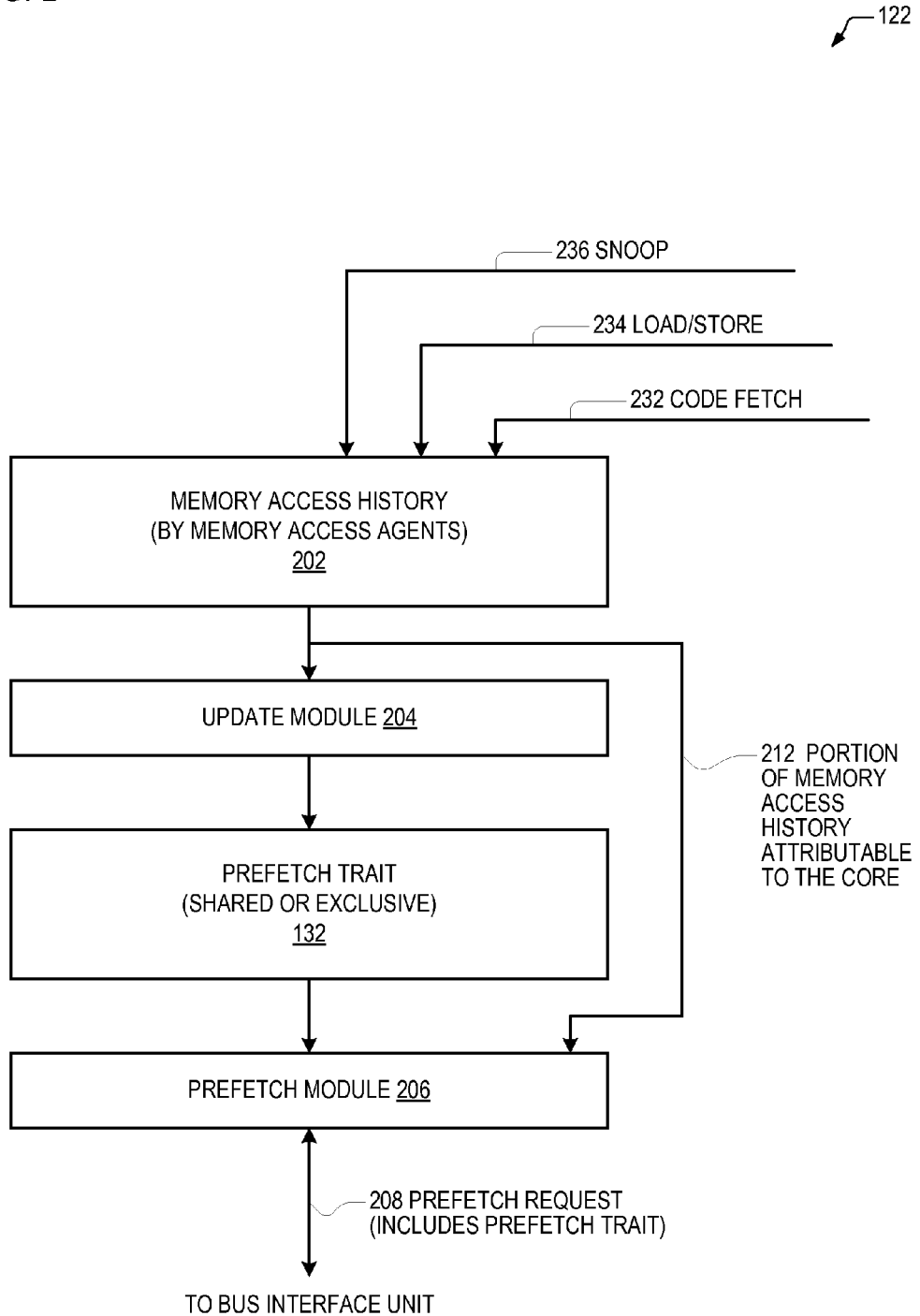
FIG. 2 is a block diagram illustrating the hardware data prefetcher of FIG. 1 in more detail.

Referring now to FIG. 2, a block diagram illustrating the hardware data prefetcher 122 of FIG. 1 in more detail is shown. The hardware data prefetcher 122 includes an update module 204 that receives information from a memory access history 202. The memory access history 202 includes information about accesses by the memory access agents 101 to the system memory 108. More specifically, the history 202 includes information about code fetches 232 (i.e., instruction fetches 232) by each core 102 from the system memory 108, program loads/stores 234 by each core 102 to the system memory 108, and snoops 236 generated in response to a system memory 108 access generated on the bus 112 by one of the memory access agents 101 other than the memory access agents 101 that comprises the hardware data prefetcher 122. The information may include, but is not limited to, the memory address, access type (e.g., instruction fetch, load, store), and identifier of the originating memory access agent 101 of each memory access, which also includes an identifier of the originating core 102. Preferably, the hardware data prefetcher 122 maintains a separate prefetch trait 132 and separate memory access history 202 for each active memory block 114 of the system memory 108 being accessed by the processor 103. The update module 204 updates the prefetch trait 132 based on analysis of the memory access history 202, embodiments of which are described herein.

The hardware data prefetcher 122 also includes a prefetch module 206 that receives the prefetch trait 132. The prefetch module 206 also receives a portion 212 of the memory access history 202 attributable to the cores 102, which enables the prefetch module 206 to analyze the history of memory accesses by the cores 102 and to predict which data will be needed in the future by the cores 102 based on the analysis. The prefetch module 206 performs hardware prefetches by generating prefetch requests 208 to the bus interface unit for the predicted data that include the prefetch trait 132. The prefetch trait 132 may have a default value, i.e., shared or exclusive. For example, the default value may be set by the state of a fuse selectively blown when the core 102 is manufactured or by a constant value in microcode of the core 102. The prefetch module 206 may prefetch one or more cache lines worth of data from the system memory 108 into the cache memory 124 and/or into another cache memory that is lower in the cache memory hierarchy of the processor 103, such as a private cache memory of a core 102.

Figure 3:
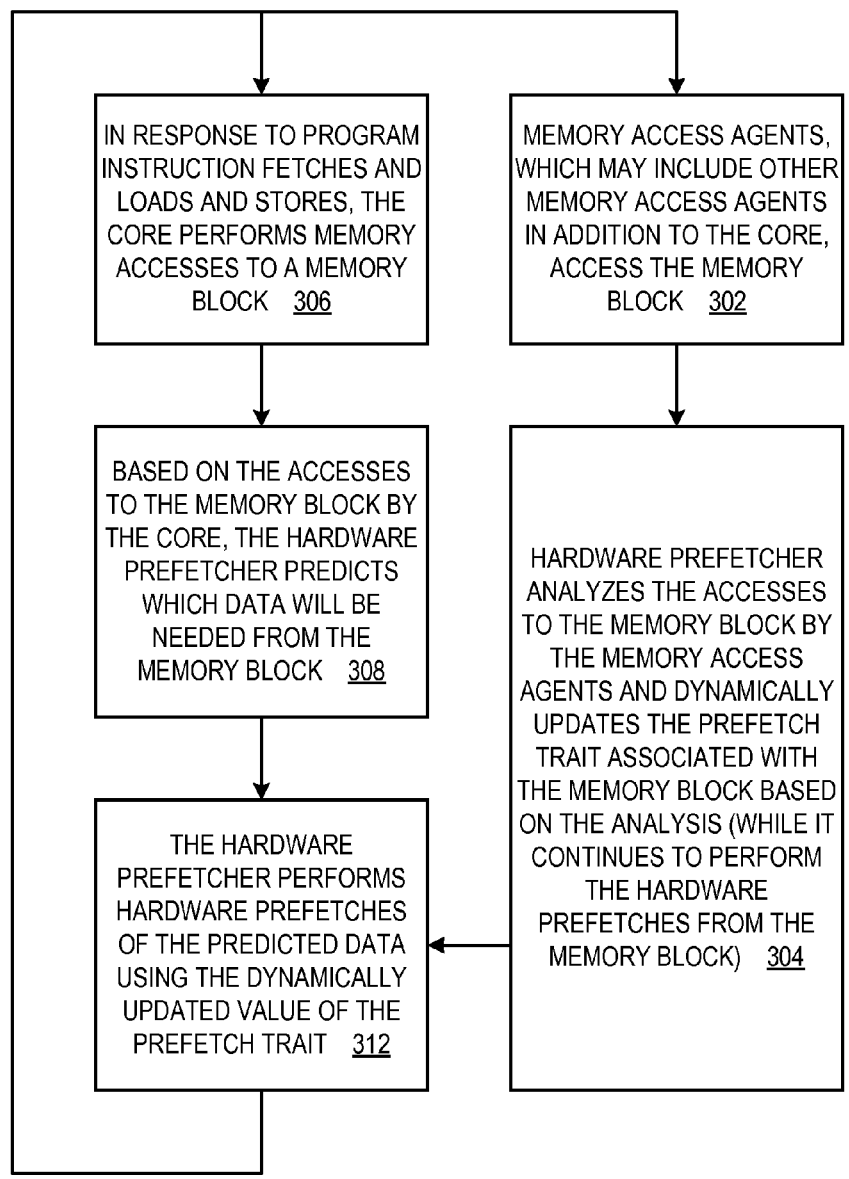
FIG. 3 is a flow diagram illustrating operation of the system of FIG. 1.

Referring now to FIG. 3, a flow diagram illustrating operation of the system 100 of FIG. 1 is shown.

At block 302, the memory access agents 101 access a memory block 114 in the system memory 108. The accesses may include accesses to the memory block 114 by the cores 102, such as those at block 306. The hardware data prefetcher 122 accumulates the information about the accesses in the memory access history 202 with respect to each active memory block 114. Flow proceeds from block 302 to block 304.

At block 304, the update module 204 analyzes the accesses to the memory block 114 by the memory access agents 101 and dynamically updates the prefetch trait 132 associated with the memory block 114 based on the analysis. The update module 204 analyzes the accesses and updates the prefetch trait 132 while the prefetch module 206 continues to perform the hardware prefetches from the memory block 114 at block 312. Thus, flow is shown from block 304 to block 312 in FIG. 3. Embodiments of the analysis are shown below with respect to the remaining Figures.

At block 306, the cores 102 run programs, which involves fetching the program instructions from the system memory 108 and performing loads and stores to the system memory 108 in response to execution of the fetched program instructions. More specifically, the instruction fetches and loads and stores are accesses to a memory block 114 of the system memory 108, such as a memory page. Typically, the accesses will be to a plurality of memory blocks 114. The hardware data prefetcher 122 accumulates the information about the accesses in the memory access history 202 with respect to each active memory block 114. Flow proceeds from block 306 to block 308.

At block 308, the prefetch module 206 predicts which data will be needed from the memory block 114 by the cores 102 based on the portion 212 of the memory access history 202 attributable to the cores 102 accumulated at block 306. Flow proceeds from block 308 to block 312.

At block 312, the prefetch module 206 performs hardware prefetches of the data predicted at block 308, and the hardware prefetches are performed using the prefetch trait 132 that is dynamically updated at block 304. Although flow is shown from block 302 to block 304 because the accesses by the memory access agents 101 drive the updating of the prefetch trait 132, it should be understood that the memory accesses by the memory access agents 101 at block 302 and the dynamic prefetch trait 132 update at block 304 may be occurring contemporaneously. Additionally, although flow is shown from block 306 to block 308 to block 312 because the memory accesses by the cores 102 drive the predictions and the predictions drive the hardware prefetches using the dynamically updated prefetch trait, it should be understood that the memory accesses by the cores 102 at block 306, the predicting at block 308 and the performance of the hardware prefetches at block 312 may all be occurring contemporaneously. As shown in FIG. 3, flow returns from block 312 to blocks 302 and 306 because the operation at blocks 302 and 304 is contemporaneous with the operation at blocks 306, 308 and 312. Thus, the prefetches performed at block 312 are hardware prefetches, and are not software prefetches.

It should be understood that although the process is described with respect to a single memory block 114, the hardware data prefetcher 122 may perform hardware data prefetches from multiple memory blocks 114, and may do so concurrently, using the dynamically updated prefetch trait 132. Preferably, the hardware data prefetcher 122 maintains a dynamically updated prefetch trait 132 associated with each of the memory blocks 114 from which it is performing hardware prefetches.

An advantage of prefetching a cache line exclusive rather than shared is that it may result in a single bus transaction rather than two bus transactions. That is, rather than a first transaction that asks for the data followed by a second transaction that gets the data with exclusive ownership, the exclusive prefetch is a single transaction that combines the two and asks for the data exclusive. This may be a particular advantage in the case of a multi-die multi-core processor in which each die has its own last-level cache.

An advantage of the hardware prefetching described herein based on a prefetch trait that dynamically varies between shared or exclusive over a software prefetch solution is that the hardware prefetching solution may observe the accesses to the memory block by other access agents at run-time, i.e., as they occur, to perform analysis for varying the prefetch trait, whereas it is difficult for a software prefetch solution to determine at compile-time when and what the accesses by the other memory access agents to the memory block will be.

Figure 4:
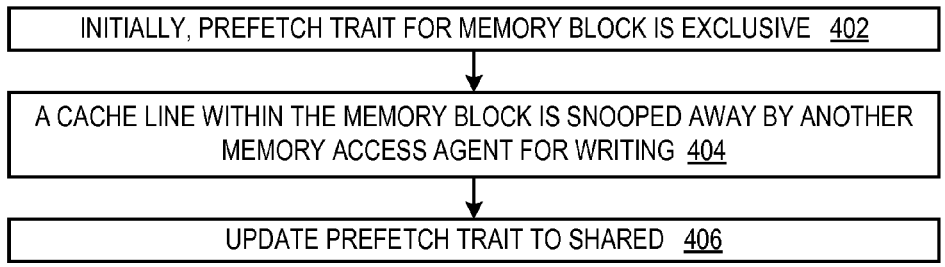
FIGS. 4 through 11 are flow diagrams illustrating dynamic updating of the prefetch trait of FIG. 1 based on analysis of accesses to a memory block by the memory access agents.

Referring now to FIG. 4, a flow diagram illustrating dynamic updating of the prefetch trait 132 of FIG. 1 based on analysis of accesses to a memory block 114 by the memory access agents 101 is shown. Flow begins at block 402.

At block 402, the prefetch trait 132 for the memory block 114 is initially exclusive. This may be because the default value is exclusive, as described above. Or, it may be because the prefetch trait 132 for the memory block 114 is initialized to exclusive based on an initial access to the memory block 114, such as according to FIG. 6 or FIG. 10. Generally speaking, if a core 102 reads data, there is a significant likelihood that it will also update the data and, generally speaking, data within a memory block 114 often has similar characteristics. Consequently, as discussed above, it may be advantageous to prefetch cache lines exclusive in order to perform a single bus transaction rather than multiple bus transactions, which may reduce bus 112 traffic and reduce latency. Flow proceeds to block 404.

At block 404, the hardware data prefetcher 122 is notified that a cache line within the memory block 114 has been snooped away by another memory access agent 101 with the intent to write the cache line, which results in an update of the memory access history 202. This may be an indication that data within other cache lines of the memory block 114 will be written by the other memory access agent 101, in which case it will likely be disadvantageous to prefetch those cache lines exclusive because there may be thrashing between the core 102 and the other memory access agent 101 for the cache line. Flow proceeds to block 406.

At block 406, the update module 204 updates the prefetch trait 132 to shared in response to the snoop at block 404. Flow ends at block 406.

Figure 5:
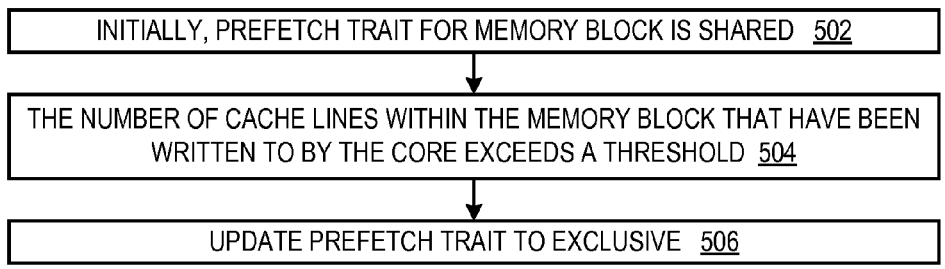

Referring now to FIG. 5, a flow diagram illustrating dynamic updating of the prefetch trait 132 of FIG. 1 based on analysis of accesses to a memory block 114 by the memory access agents 101 is shown. Flow begins at block 502.

At block 502, the prefetch trait 132 for the memory block 114 is initially shared. This may be because the default value is shared, as described above. Or, it may be because the prefetch trait 132 for the memory block 114 is initialized to shared based on an initial access to the memory block 114, such as according to FIG. 6 or FIG. 10. Flow proceeds to block 504.

At block 504, the hardware data prefetcher 122 is keeping track (e.g., in the memory access history 202) of the number of cache lines within the memory block 114 that have been written to by the core 102 and detects that the number has exceeded a threshold. This may be an indication that data within other cache lines of the memory block 114 will be written by the core 102, in which case it will likely be advantageous to prefetch those cache lines exclusive for the reasons described herein. The threshold may be a predetermined value or may be a value that is programmable by system software or may be a value dynamically updated by the hardware data prefetcher 122 based on analysis of prefetch performance. In one embodiment, the threshold is one, i.e., the prefetch trait 132 is updated to exclusive upon the first write to the memory block 114. Flow proceeds to block 506.

At block 506, the update module 204 updates the prefetch trait 132 to exclusive in response to the threshold being exceeded at block 504. Flow ends at block 506.

Figure 6:
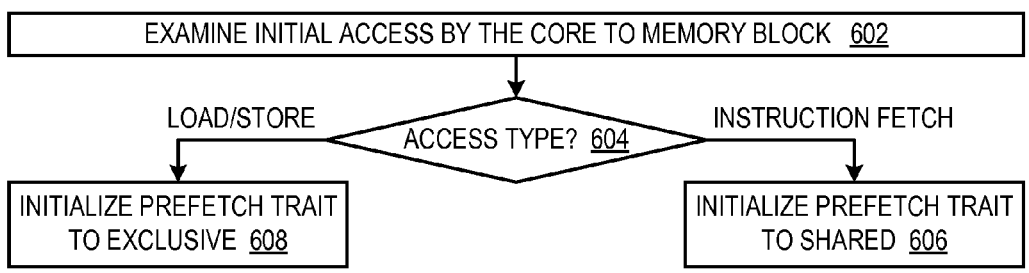

Referring now to FIG. 6, a flow diagram illustrating dynamic updating of the prefetch trait 132 of FIG. 1 based on analysis of accesses to a memory block 114 by the memory access agents 101 is shown. Flow begins at block 602.

At block 602, the update module 204 examines an initial access by a core 102 to the memory block 114. Flow proceeds to decision block 604.

At decision block 604, the update module 204 determines whether the initial access was an instruction fetch or a load/store. If an instruction fetch, flow proceeds to block 606; otherwise, flow proceeds to block 608.

At block 606, the update module 204 updates the prefetch trait 132 to shared in response to determining the initial access was an instruction fetch at block 604. This may be advantageous because it may be likely that if one instruction fetch was performed from the memory block 114, then the remainder of the accesses to the memory block 114 will be instruction fetches, and typically the memory locations that contain instructions are not written once they are loaded into memory. In one embodiment, the hardware data prefetcher 122 continues to perform hardware prefetches from the memory block 114 using the dynamically updated shared prefetch trait 132 at block 606. However, in other embodiments as described herein, the initialized prefetch trait 132 may be updated from shared to exclusive (and vice versa) as the hardware data prefetcher 122 monitors and analyzes accesses to the memory block 114. Flow ends at block 606.

At block 608, the update module 204 updates the prefetch trait 132 to exclusive in response to determining the initial access was a load/store at block 604. In one embodiment, the hardware data prefetcher 122 continues to perform hardware prefetches from the memory block 114 using the dynamically updated exclusive prefetch trait 132 at block 608. However, in other embodiments as described herein, the initialized prefetch trait 132 may be updated from exclusive to shared (and vice versa) as the hardware data prefetcher 122 monitors and analyzes accesses to the memory block 114. Flow ends at block 608.

Figure 7:
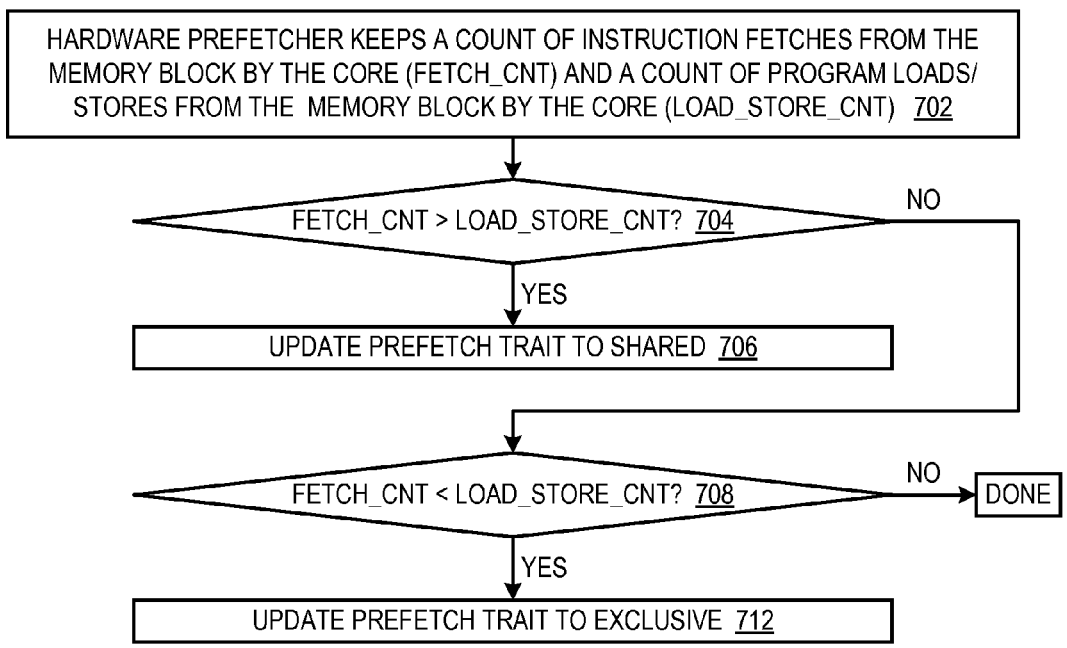

Referring now to FIG. 7, a flow diagram illustrating dynamic updating of the prefetch trait 132 of FIG. 1 based on analysis of accesses to a memory block 114 by the memory access agents 101 is shown. Flow begins at block 702.

At block 702, the hardware data prefetcher 122 is keeping a count (e.g., in the memory access history 202) of the number of instruction fetches from the memory block 114 by a core 102, referred to as the fetch_cnt, and a count of the number of program loads/stores to the memory block 114, referred to as the load_store_cnt. Flow proceeds to decision block 704.

At decision block 704, the update module 204 determines whether the fetch_cnt is greater than the load_store_cnt. If so, flow proceeds to block 706; otherwise, flow proceeds to decision block 708.

At block 706, the update module 204 updates the prefetch trait 132 to shared in response to determining the fetch_cnt is greater than the load_store_cnt at block 704. Flow ends at block 706.

At decision block 708, the update module 204 determines whether the fetch_cnt is less than the load_store_cnt. If so, flow proceeds to block 712; otherwise, flow ends.

At block 712, the update module 204 updates the prefetch trait 132 to exclusive in response to determining the fetch_cnt is less than the load_store_cnt at block 708. Flow ends at block 712.

Figure 8:
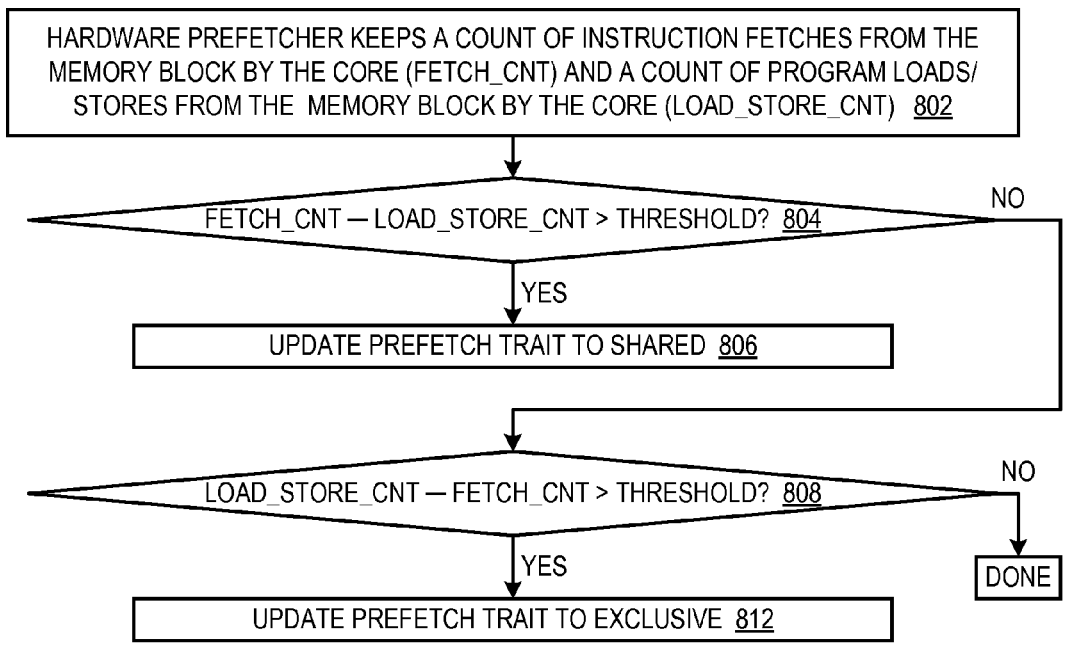

Referring now to FIG. 8, a flow diagram illustrating dynamic updating of the prefetch trait 132 of FIG. 1 based on analysis of accesses to a memory block 114 by the memory access agents 101 is shown. Flow begins at block 802.

At block 802, the hardware data prefetcher 122 is keeping a count (e.g., in the memory access history 202) of the number of instruction fetches from the memory block 114 by a core 102, referred to as the fetch_cnt, and a count of the number of program loads/stores to the memory block 114, referred to as the load_store_cnt. Flow proceeds to decision block 804.

At decision block 804, the update module 204 determines whether a difference between the fetch_cnt and the load_store_cnt is greater than a threshold. If so, flow proceeds to block 806; otherwise, flow proceeds to decision block 808. The threshold may be a predetermined value or may be a value that is programmable by system software or may be a value dynamically updated by the hardware data prefetcher 122 based on analysis of prefetch performance.

At block 806, the update module 204 updates the prefetch trait 132 to shared in response to determining the difference between the fetch_cnt and the load_store_cnt is greater than the threshold at block 804. Flow ends at block 806.

At decision block 808, the update module 204 determines whether a difference between the load_store_cnt and the fetch_cnt is greater than a threshold. If so, flow proceeds to block 812; otherwise, flow ends. The threshold value used at block 808 may be the same or different than the threshold value used at decision block 804.

At block 812, the update module 204 updates the prefetch trait 132 to exclusive in response to determining the difference between the load_store_cnt and the fetch_cnt is greater than the threshold at block 808. Flow ends at block 812.

Figure 9:
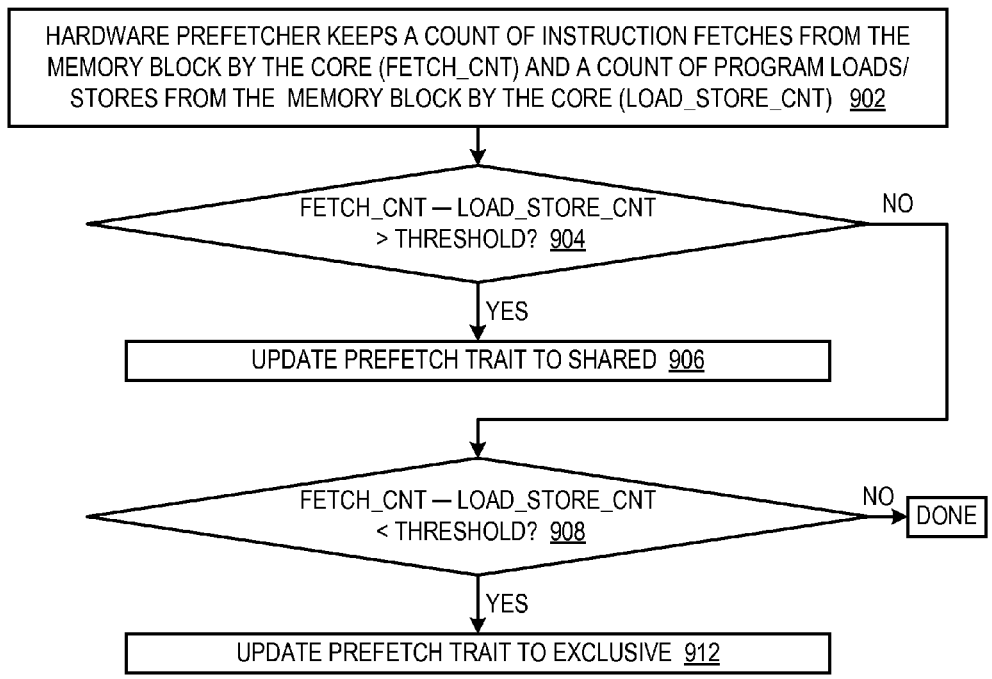

Referring now to FIG. 9, a flow diagram illustrating dynamic updating of the prefetch trait 132 of FIG. 1 based on analysis of accesses to a memory block 114 by the memory access agents 101 is shown. Flow begins at block 902.

At block 902, the hardware data prefetcher 122 is keeping a count (e.g., in the memory access history 202) of the number of instruction fetches from the memory block 114 by a core 102, referred to as the fetch_cnt, and a count of the number of program loads/stores to the memory block 114, referred to as the load_store_cnt. Flow proceeds to decision block 904.

At decision block 904, the update module 204 determines whether a difference between the fetch_cnt and the load_store_cnt is greater than a threshold. If so, flow proceeds to block 906; otherwise, flow proceeds to decision block 908.

At block 906, the update module 204 updates the prefetch trait 132 to shared in response to determining the difference between the fetch_cnt and the load_store_cnt is greater than the threshold at block 904. Flow ends at block 906.

At decision block 908, the update module 204 determines whether the difference between the fetch_cnt and the load_store_cnt is less than a threshold. If so, flow proceeds to block 912; otherwise, flow ends. The threshold value used at block 908 may be the same or different than the threshold value used at decision block 904.

At block 912, the update module 204 updates the prefetch trait 132 to exclusive in response to determining the fetch_cnt and the load_store_cnt is less than the threshold at block 908. Flow ends at block 912.

Figure 10:
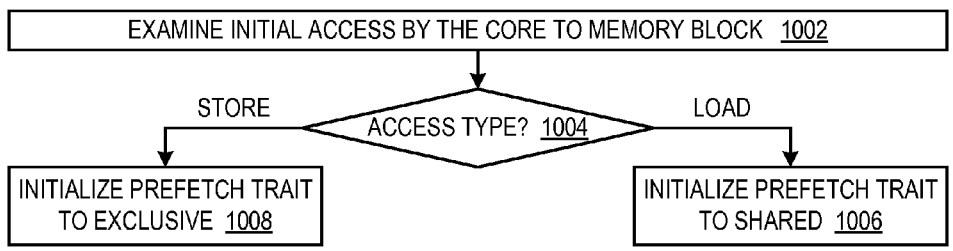

Referring now to FIG. 10, a flow diagram illustrating dynamic updating of the prefetch trait 132 of FIG. 1 based on analysis of accesses to a memory block 114 by the memory access agents 101 is shown. Flow begins at block 1002.

At block 1002, the update module 204 examines an initial access by a core 102 to the memory block 114. Flow proceeds to decision block 1004.

At decision block 1004, the update module 204 determines whether the initial access was store or a load. If a load, flow proceeds to block 1006; otherwise, flow proceeds to block 1008. In this context, a load access includes both a fetch of a program instruction and a load performed by a program load instruction.

At block 1006, the update module 204 updates the prefetch trait 132 to shared in response to determining the initial access was a load at block 1004. In one embodiment, the hardware data prefetcher 122 continues to perform hardware prefetches from the memory block 114 using the dynamically updated shared prefetch trait 132 at block 1006. However, in other embodiments as described herein, the initialized prefetch trait 132 may be updated from shared to exclusive (and vice versa) as the hardware data prefetcher 122 monitors and analyzes accesses to the memory block 114. Flow ends at block 1006.

At block 1008, the update module 204 updates the prefetch trait 132 to exclusive in response to determining the initial access was a store at block 1004. This may be advantageous because it may be likely that if one store was performed to the memory block 114, then other accesses to the memory block 114 will be stores. In one embodiment, the hardware data prefetcher 122 continues to perform hardware prefetches from the memory block 114 using the dynamically updated exclusive prefetch trait 132 at block 1008. However, in other embodiments as described herein, the initialized prefetch trait 132 may be updated from exclusive to shared (and vice versa) as the hardware data prefetcher 122 monitors and analyzes accesses to the memory block 114. Flow ends at block 1008.

Figure 11:
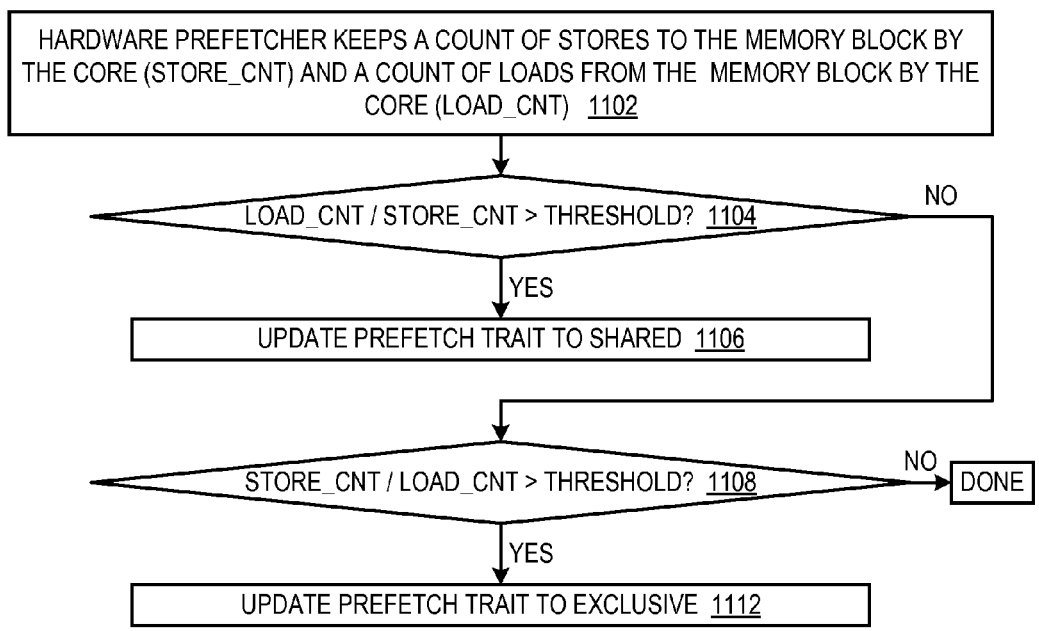

Referring now to FIG. 11, a flow diagram illustrating dynamic updating of the prefetch trait 132 of FIG. 1 based on analysis of accesses to a memory block 114 by the memory access agents 101 is shown. Flow begins at block 1102.

At block 1102, the hardware data prefetcher 122 is keeping a count (e.g., in the memory access history 202) of the number of loads from the memory block 114 by a core 102, referred to as the load_cnt, and a count of the number of program stores to the memory block 114, referred to as the store_cnt. Flow proceeds to decision block 1104.

At decision block 1104, the update module 204 determines whether a ratio of the load_cnt to the store_cnt is greater than a threshold. If so, flow proceeds to block 1106; otherwise, flow proceeds to decision block 1108. The threshold may be a predetermined value or may be a value that is programmable by system software or may be a value dynamically updated by the hardware data prefetcher 122 based on analysis of prefetch performance.

At block 1106, the update module 204 updates the prefetch trait 132 to shared in response to determining the ratio of the load_cnt to the store_cnt is greater than the threshold at block 1104. Flow ends at block 1106.

At decision block 1108, the update module 204 determines whether a ratio of the store_cnt to the load_cnt is greater than a threshold. If so, flow proceeds to block 1112; otherwise, flow ends. The threshold value used at block 1108 may be the same or different than the threshold value used at decision block 1104.

At block 1112, the update module 204 updates the prefetch trait 132 to exclusive in response to determining the ratio of the store_cnt to the load_cnt is greater than the threshold at block 1108. Flow ends at block 1112.

Figure 12:
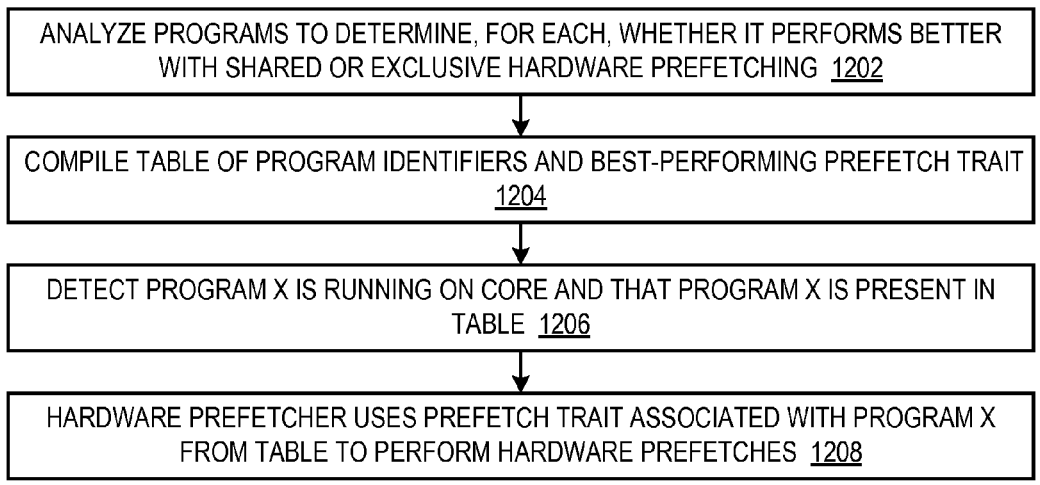
FIG. 12 is a flow diagram illustrating a method of performing hardware prefetching using a prefetch trait determined using offline program analysis.

Referring now to FIG. 12, a flow diagram illustrating a method of performing hardware prefetching using a prefetch trait determined using offline program analysis is shown. Flow begins at block 1202.

At block 1202, a program is analyzed to determine whether the program performs better on a processor while the processor is configured to perform hardware prefetches with a shared prefetch trait or with an exclusive prefetch trait. The analysis is performed for each of a plurality of different programs of interest, e.g., programs that are frequently executed or programs which are known to generally require a long time to run and therefore whose performance is important to maximize. Preferably, the program is executed multiple times while the processor is configured to perform hardware prefetches with a shared prefetch trait and multiple times while the processor is configured to perform hardware prefetches with an exclusive prefetch trait and the performance is recorded, e.g., for each of the shared and exclusive configurations, an average of the results from the multiple runs is computed. In an alternate embodiment, the analysis is performed using collaborative experimentation among many systems in communication with a server that provide configuration information and performance data when the systems are configured using the configuration information to dynamically determine improved system configuration, embodiments of which are described in U.S. patent application Ser. Nos. 14/474,623 and 14/474,699 filed on Sep. 2, 2014, each of which claims priority to U.S. Provisional Application No. 62/000,808 on May 20, 2014, each of which is hereby incorporated by reference in its entirety for all purposes. In this case, the dynamic system configuration comprises dynamic update of the prefetch trait 132. Flow proceeds to block 1204.

At block 1204, a table is compiled that has an entry for each of the programs. Preferably, each entry includes identifying characteristics of the program and the prefetch trait that provided the best performance at block 1202. The identifying characteristics may include a program name (e.g., process name known by the operating system), memory access patterns and/or quantities of different types of instructions used by the program. The table may be included in system software that eventually runs on the processor 103, such as a device driver. Flow proceeds to block 1206.

At block 1206, a program in the table is detected to be running on the processor 103. In one embodiment, system software detects the program is running. For example, the operating system may look up the name of the program in its running process table as it looks up the name of each program in the table in its running process table. In another embodiment, the table is downloaded into the processor 103 by the operating system at initialization time, and the processor 103 itself detects the program is running. For example, the processor 103 may gather identifying characteristics about the program while it is running (e.g., memory access patterns and/or quantities of different types of instructions used by the program) and match the identifying characteristics with an entry in the table compiled at block 1204 and downloaded into the processor 103. Flow proceeds to block 1208.

At block 1208, the hardware data prefetcher 122 performs hardware prefetches for the program detected at block 1206 using the prefetch trait from the table entry associated with the detected program. Flow ends at block 1208.

Figure 13:
FIG. 13 is a block diagram illustrating a plurality of range registers.

Referring now to FIG. 13, a block diagram illustrating a plurality of range registers 1300 is shown. The range registers 1300 are included in the hardware data prefetcher 122. In one embodiment, the hardware data prefetcher 122 includes a set of range registers 1300 associated with each of the cores 102. Each range register 1300 includes an address range field 1302 and a prefetch trait field 1304. Each address range field 1302 is programmable to specify a range of addresses within the address space of the processor 103. The prefetch trait 1304 specifies a prefetch trait, which is either shared or exclusive. As the prefetch module 206 predicts an address of data to hardware prefetch, the prefetch module 206 determines whether the predicted address is within one of the address ranges specified in the range registers 1300. If so, the prefetch module 206 generates the prefetch request 208 with the prefetch trait specified in the associated prefetch trait field 1304. If not, in one embodiment the prefetch module 206 generates the prefetch request 208 with a default prefetch trait. In one embodiment, the default prefetch trait is shared, such that the range registers 1300 need only be used to specify address ranges for which exclusive hardware prefetches are desired. In another embodiment, the default prefetch trait is exclusive, such that the range registers 1300 need only be used to specify address ranges for which shared hardware prefetches are desired. In these embodiments, the prefetch trait field 1304 may not be needed since it may be implicitly specified as the opposite of the default prefetch trait.

Figure 14:
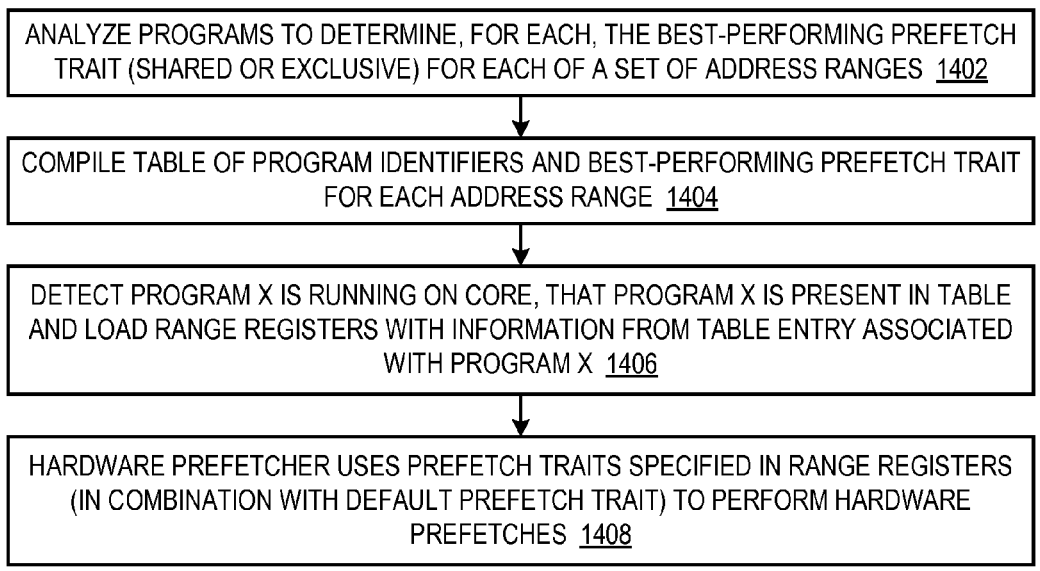
FIG. 14 is a flow diagram illustrating a method of performing hardware prefetching using a prefetch trait determined from the range registers of FIG. 13.

Referring now to FIG. 14, a flow diagram illustrating a method of performing hardware prefetching using a prefetch trait determined from the range registers 1300 of FIG. 13 is shown. Flow begins at block 1402.

At block 1402, a program is analyzed to determine whether various programs perform better on a processor while the processor is configured to perform hardware prefetches with a shared prefetch trait or with an exclusive prefetch trait, similar to the manner described above with respect to FIG. 12. However, the analysis performed at block 1402 includes finer granularity than the analysis performed at block 1202. More specifically, the analysis involves evaluating the performance of each program with each of the shared and exclusive prefetch traits with respect to different address ranges programmed into the range registers 1300. Thus, for example, address ranges that include data that is accessed by multiple memory access agents 101 may advantageously be included in the table with a prefetch trait of shared, whereas address ranges that include data that is written by a single core 102 may advantageously be included in the table with a prefetch trait of exclusive. Flow proceeds to block 1404.

At block 1404, a table is compiled that has an entry for each of the programs similar to the manner described above with respect to block 1204. However, the table compiled at block 1404 includes address ranges and associated prefetch traits for populating the range registers 1300. Flow proceeds to block 1406.

At block 1406, a program in the table is detected to be running on the processor 103 similar to the manner described above with respect to block 1206. However, when the running program is detected, additionally the range registers 1300 are programmed with the information from the table entry associated with the detected program. In one embodiment, the operating system programs the range registers 1300. In an alternate embodiment, the processor 103 itself programs the range registers 1300 in response to detecting the program. For example, microcode of the processor 103 may program the range registers 1300. Flow proceeds to block 1408.

At block 1408, the hardware data prefetcher 122 performs hardware prefetches for the program detected at block 1406 using the prefetch traits 1304 of the range registers 1300 in combination with a default prefetch trait. Flow ends at block 1408.

Although various embodiments have been described in which the prefetch trait 132 is dynamically updated, other embodiments are contemplated. For example, in one embodiment a saturating counter is maintained for each active memory block 114. When an access is made by one of the memory access agents 101 to the memory block 114 that tends to indicate a benefit from exclusive hardware prefetch (e.g., a store or load/store), then the update module 204 counts up in a saturating fashion, whereas when an access is made that tends to indicate a benefit from shared hardware prefetch (e.g., a load or instruction fetch), then the update module 204 counts down in a saturating fashion. Preferably, the prefetch trait 132 is the most significant bit of the saturating counter. For another example, the update module 204 maintains a queue (e.g., a shift register) that stores information (e.g., store, load/store, instruction fetch) about each of the most recent N accesses to the memory block 114, where N is greater than one. The update module 204 dynamically updates the prefetch trait 132 to either exclusive or shared based on whether the information stored in the queue indicates benefit from exclusive or shared hardware prefetches, e.g., if more of the most recent N accesses are stores, then update to exclusive, whereas if more of the most recent N accesses are instruction fetches, then update to shared. For yet another example, for each hardware prefetch the prefetch module 206 performs from the memory block 114, the update module 204 maintains an indication of the prefetch trait 132 that was used. As accesses occur to each of the prefetched cache lines, the update module 204 updates the indication to exclusive if the accessing memory access agent 101 writes the cache line associated with the indication and updates the indication to shared if the cache line is snooped away. In this manner a bitmap is maintained of the cache lines in the memory block 114 that indicates approximately the best prefetch trait that would have been used for different cache lines in the memory block 114. The update module 204 searches for patterns within the bitmap and looks to see if the address of the next cache line to be hardware prefetched fits in any of the patterns and uses the bitmap to dynamically determine the prefetch trait 132 to be used to hardware prefetch the cache line. Finally, although embodiments have been described in which the hardware data prefetcher is included in a multi-core processor, in other embodiments the hardware data prefetcher may be included in a single core processor.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a processor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a processor device that may be used in a general-purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

The invention claimed is:

1. A hardware data prefetcher comprised in a memory access agent, wherein the memory access agent is one of a plurality of memory access agents that share a memory, the hardware data prefetcher comprising:
a prefetch trait that is initially either exclusive or shared;
a prefetch module that performs hardware prefetches from a memory block of the shared memory using the prefetch trait; and
an update module that performs analysis of accesses to the memory block by the plurality of memory access agents and, based on the analysis, dynamically updates the prefetch trait to either exclusive or shared while the prefetch module performs hardware prefetches from the memory block using the prefetch trait.

2. The hardware data prefetcher of claim 1, wherein the update module updates the prefetch trait to shared when the analysis indicates a cache line within the memory block is snooped away from the memory access agent by one of the other memory access agents.

3. The hardware data prefetcher of claim 1, wherein the update module updates the prefetch trait to exclusive when the analysis indicates a number of cache lines within the memory block that have been written to by the memory access agent exceeds a threshold.

4. The hardware data prefetcher of claim 1, wherein the update module updates the prefetch trait to shared when the analysis indicates an initial access to the memory block by the memory access agent is an instruction fetch and updates the prefetch trait to exclusive when the analysis indicates an initial access to the memory block by the memory access agent is a program load/store.

5. The hardware data prefetcher of claim 1, wherein the update module updates the prefetch trait based on analysis of a count of instruction fetches from the memory block by the memory access agent relative to a count of program loads/stores to the memory block by the memory access agent.

6. The hardware data prefetcher of claim 5, wherein the update module updates the prefetch trait to shared when the count of instruction fetches is greater than the count of program loads/stores and updates the prefetch trait to exclusive when the count of instruction fetches is less than the count of program loads/stores.

7. The hardware data prefetcher of claim 5, wherein the update module updates the prefetch trait to shared when a difference between the count of instruction fetches and the count of program loads/stores exceeds a first threshold and updates the prefetch trait to exclusive when a difference between the count of program loads/stores and the count of instruction fetches exceeds a second threshold.

8. The hardware data prefetcher of claim 5, wherein the update module updates the prefetch trait to shared when a difference between the count of instruction fetches and the count of program loads/stores exceeds a first threshold and updates the prefetch trait to exclusive when the difference falls below a second threshold.

9. The hardware data prefetcher of claim 1, wherein the update module updates the prefetch trait to shared when the analysis indicates an initial access to the memory block by the memory access agent is a load and updates the prefetch trait to exclusive when the analysis indicates an initial access to the memory block by the memory access agent is a store.

10. The hardware data prefetcher of claim 1, wherein the update module updates the prefetch trait based on analysis of a count of loads from the memory block by the memory access agent relative to a count of stores to the memory block by the memory access agent.

11. The hardware data prefetcher of claim 10, wherein the update module updates the prefetch trait to shared when a ratio of the count of loads and the count of stores exceeds a first threshold and updates the prefetch trait to exclusive when a ratio of the count of stores and the count of loads exceeds a second threshold.

12. The hardware data prefetcher of claim 1, wherein the update module saturatingly counts a saturating counter in a direction in response to accesses to the memory block that tend to indicate benefit from exclusive hardware prefetches and saturatingly counts the saturating counter in the other direction in response to accesses to the memory block that tend to indicate benefit from shared hardware prefetches, wherein the update module derives the prefetch trait from a value of the saturating counter.

13. The hardware data prefetcher of claim 1, wherein the update module maintains a queue that stores information about each of the most recent N accesses to the memory block, wherein N is greater than one, wherein the update module dynamically updates the prefetch trait to either exclusive or shared based on whether the information stored in the queue indicates benefit from exclusive or shared hardware prefetches.

14. The hardware data prefetcher of claim 1, wherein for each hardware prefetch from the memory block the update module maintains an indication of the prefetch trait used, wherein the update module updates the indication to exclusive if an address associated with the indication is written by the memory access agent and updates the indication to shared if the address is snooped away from the memory access agent by one of the other memory access agents, wherein the update module uses the indications to dynamically update the prefetch trait.

15. A method for hardware data prefetching by a memory access agent, wherein the memory access agent is one of a plurality of memory access agents that share a memory, the method comprising:
  initializing a prefetch trait to either exclusive or shared;
  performing hardware prefetches from a memory block of the shared memory using the prefetch trait;
  performing analysis of accesses to the memory block by the plurality of memory access agents; and
  dynamically updating the prefetch trait to either exclusive or shared based on the analysis while the prefetch module performs hardware prefetches from the memory block using the prefetch trait;
  wherein said dynamically updating the prefetch trait comprises updating the prefetch trait to shared when the analysis indicates a cache line within the memory block is snooped away from the memory access agent by one of the other memory access agents.

16. The method of claim 15, wherein said dynamically updating the prefetch trait comprises updating the prefetch trait to exclusive when the analysis indicates a number of cache lines within the memory block that have been written to by the memory access agent exceeds a threshold.

17. The method of claim 15, wherein said dynamically updating the prefetch trait comprises updating the prefetch trait based on analysis of a count of instruction fetches from the memory block by the memory access agent relative to a count of program loads/stores to the memory block by the memory access agent.

18. The method of claim 15, wherein said dynamically updating the prefetch trait comprises updating the prefetch trait based on analysis of a count of loads from the memory block by the memory access agent relative to a count of stores to the memory block by the memory access agent.

19. The method of claim 15, further comprising:
  saturatingly counting a saturating counter in a direction in response to accesses to the memory block that tend to indicate benefit from exclusive hardware prefetches;
  saturatingly counting the saturating counter in the other direction in response to accesses to the memory block that tend to indicate benefit from shared hardware prefetches; and
  wherein said dynamically updating the prefetch trait comprises deriving the prefetch trait from a value of the saturating counter.

20. The method of claim 15, further comprising:
  maintaining a queue that stores information about each of the most recent N accesses to the memory block, wherein N is greater than one; and
  wherein said dynamically updating the prefetch trait comprises updating the prefetch trait to either exclusive or shared based on whether the information stored in the queue indicates benefit from exclusive or shared hardware prefetches.

21. The method of claim 15, further comprising:
  for each hardware prefetch from the memory block maintaining an indication of the prefetch trait used;
  updating the indication to exclusive if an address associated with the indication is written by the memory access agent;
  updating the indication to shared if the address is snooped away from the memory access agent by one of the other memory access agents; and
  wherein said dynamically updating the prefetch trait comprises using the indications to dynamically update the prefetch trait.

22. A method for hardware data prefetching by a memory access agent, wherein the memory access agent is one of a plurality of memory access agents that share a memory, the method comprising:
  initializing a prefetch trait to either exclusive or shared;
  performing hardware prefetches from a memory block of the shared memory using the prefetch trait;
  performing analysis of accesses to the memory block by the plurality of memory access agents; and
  dynamically updating the prefetch trait to either exclusive or shared based on the analysis while the prefetch module performs hardware prefetches from the memory block using the prefetch trait;
  wherein said dynamically updating the prefetch trait comprises updating the prefetch trait to shared when the analysis indicates an initial access to the memory block by the memory access agent is an instruction fetch and updating the prefetch trait to exclusive when the analysis indicates an initial access to the memory block by the memory access agent is a program load/store.

23. A method for hardware data prefetching by a memory access agent, wherein the memory access agent is one of a plurality of memory access agents that share a memory, the method comprising:
  initializing a prefetch trait to either exclusive or shared;
  performing hardware prefetches from a memory block of the shared memory using the prefetch trait;
  performing analysis of accesses to the memory block by the plurality of memory access agents; and
  dynamically updating the prefetch trait to either exclusive or shared based on the analysis while the prefetch module performs hardware prefetches from the memory block using the prefetch trait;
  wherein said dynamically updating the prefetch trait comprises updating the prefetch trait to shared when the analysis indicates an initial access to the memory block by the memory access agent is a load and updates the prefetch trait to exclusive when the analysis indicates an initial access to the memory block by the memory access agent is a store.

* * * * *